United States Patent [19]

Ford, Jr. et al.

[11] 3,915,636

[45] Oct. 28, 1975

[54] AGGREGATE SURFACE AREA MEASUREMENT METHOD

[75] Inventors: Miller C. Ford, Jr., Fayetteville, Ark.; Phillip G. Manke, Stillwater, Okla.

[73] Assignee: Oklahoma State University, Stillwater, Okla.

[22] Filed: Feb. 11, 1974

[21] Appl. No.: 429,547

[52] U.S. Cl. ............ 23/230 R; 23/230 C; 23/253 R; 73/432 PS
[51] Int. Cl.$^2$ .................. G01N 15/00; G01N 7/18; G01N 33/42
[58] Field of Search .......... 23/253 R, 230 R, 230 C; 73/146, 432 PS

[56] References Cited
UNITED STATES PATENTS

| | | | |
|---|---|---|---|
| 1,372,405 | 3/1921 | Cushman | 23/253 R |
| 1,874,339 | 8/1932 | Norton | 23/230 R |
| 2,997,372 | 8/1961 | Burquist et al. | 23/230 R |
| 3,153,580 | 10/1964 | Mihram et al. | 23/290 |
| 3,459,505 | 8/1969 | Tweed | 23/230 R |
| 3,578,404 | 5/1971 | Walles et al. | 23/230 R |

OTHER PUBLICATIONS
*Analytical Chemistry,* V. 28, pp. 1981–1983 (1956).

*Primary Examiner*—Morris O. Wolk
*Assistant Examiner*—Timothy W. Hagan

[57] ABSTRACT

Method and apparatus for determining the exposed surface area of a plurality of samples of selected mineral aggregate particles which have previously been coated with asphalt and subsequently partially stripped of asphalt. The method involves placing a first sample of aggregate particles of selected size and total number into a closed chamber and subjecting the samples to a reagent solution capable of dissolving or etching certain mineral constituents of the samples, in the area which has been stripped of asphalt. Using a selected volume and concentration of such reagent solution, the pressure of the gas formed as one of the byproducts is measured as a function of time. The rate of increase of pressure will be a function not only of the reagent and its concentration, but also of the exposed area of the mineral particles. The same procedure is followed for a sample which has substantially the same average size and number of particles and presumably substantially the same total surface area, which would represent the situation for complete stripping of the asphalt coating. Comparison of the pressures at selected times will give a number representing the percentage of surface area stripped in the first procedure. In addition to measurement of pressure of a gaseous byproduct, it is possible also to measure temperature of the solution, or temperature in the gas space in the container as a function of time.

4 Claims, 1 Drawing Figure

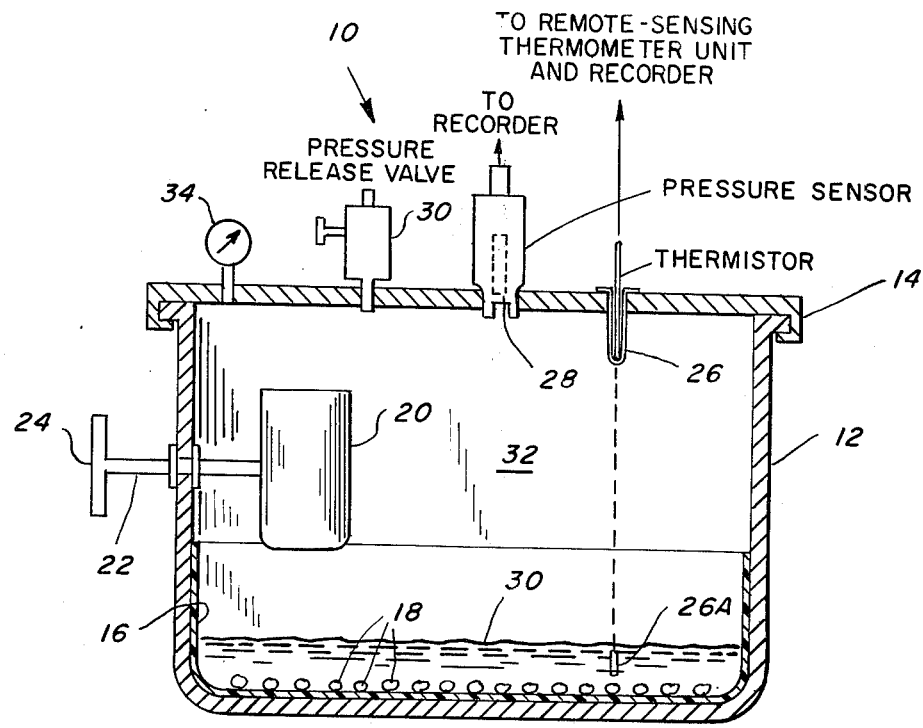

AGGREGATE SURFACE AREA MEASUREMENT METHOD

BACKGROUND OF THE INVENTION

This invention lies in the field of determining physical characteristics of mineral aggregates. More specifically, it concerns the testing of such aggregates as to their ability to retain a coating of asphalt in response to wear and to exposure to the action of water. Still more particularly, it concerns studies of aggregate minerals which are introduced into asphalt mixtures for road surfacing wherein the ability of the mineral aggregate to bond to the asphalt and the wear characteristics of the mineral particles on the surface are important.

This problem of study of suitable mineral aggregates for use in the paving of roads with asphalt aggregate mixtures is one of long standing. However, heretofore there have not been any satisfactory methods of making such determinations. Prior to this invention the methods of measuring the surface area of finely divided substances included measurements of adsorption and permeability, etc. These methods are discussed by Fries in A. S. T. M. Special Technical Publication 234, 1958. Adsorption and permeability methods of surface area determination are not applicable to measuring the "stripped" surface area of a partially asphalt coated aggregate sample.

Examination of other literature reveals several proposed methods of measuring the stripped surface area of an aggregate sample which includes radioactive isotope tracers, die adsorption, leaching procedures, etc., none of which have been commercially useful. Other methods involve the simple procedure of estimating by eye the proportion of the surface area visible to the eye that has been stripped of asphalt. Needless to say this is exceedingly inaccurate since it does not include the surfaces of the particles which are not visible to the eye.

SUMMARY OF THE INVENTION

It is a primary object of this invention to provide a quick and accurate method of determining the surface area of small irregularly shaped fragments or particles of macroscopic size of mineral aggregate which are stripped of asphalt under certain selected submergence and test procedures.

This invention operates on the principle that calcareous or siliciferous minerals will react with a suitable reagent and create a gas as part of the chemical reaction products. Within reasonable time limits in a sealed container, the generated gas creates a certain amount of pressure that can be considered proportional to the mineral surface area exposed to the reagent. The amount of heat generated during this reaction may also be used as a parameter for determining surface area. With proper selection of reagents and reagent concentrations, asphalt, being a relatively inert substance, will not enter into the reaction and will not contribute to the created gas pressure. Thus, this measurement technique is ideally suited for quantitative determination of the exposed or uncoated surface area of an aggregate sample that has been partially stripped of its asphalt coating.

The method utilizes a closed chamber into which is introduced a selected weight and number of mineral aggregate particles of a particular size range. The sealed chamber has a container of chemical reagent which by remote control can be emptied onto the floor of the container to submerge the mineral particles under the chemical solution. The reagent chosen depends upon the type of minerals present in the aggregate, and such solution is chosen so as to dissolve or leach or chemically change the mineral constituents so as to provide an evolution of a gaseous byproduct. The gaseous byproduct forms a pressure in the closed container, which increases with time of submergence in the solution. This pressure is recorded. Additionally, temperature measurements may be made in the gaseous atmosphere of the inside of the chamber, or in the liquid solution itslef. By controlling the time of application and measuring pressure, temperature, etc., and comparing these results with the corresponding measurements made with a duplicate sample of mineral aggregate particles which has not been coated with asphalt, a relative area measurement can be provided between the stripped and the original mineral samples.

BRIEF DESCRIPTION OF THE DRAWING

These and other objects of this invention and a better understanding of the principles and details of the invention will be evident from the following description taken in conjunction with the attached drawing which shows a reaction chamber and reagent cup with appropriate pressure and temperature measuring devices.

DESCRIPTION OF THE PREFERRED EMBODIMENT

Referring now to the drawing, there is shown, as indicated by the numeral 10, one embodiment of the apparatus of this invention. It contains a chamber 12 with a cover plate 14 which can be locked and sealed by means not shown, but well known in the art, so as to provide a pressure tight enclosure in the inside of the chamber. The material of which the chamber is made must be chemically inert to the reagents used or a plastic liner or cup can be placed in the inside of the chamber so as to protect the walls and bottom of the chamber from possible chemical activity with the chemical reagents which are used to contact the mineral samples 18 which are introduced into the container prior to closing the cover. A selected weight and number of individual aggregate particles are provided, each of which is within a selected range of size.

Tests have indicated that selecting different aggregate samples on the basis of size and number results in substantially identical measurements so that comparison of two samples of the same material will give substantially the same answers. A reagent cup 20, which is mounted by means of a rotatable sealed shaft 22 through the wall of the container, and operated by a handle 24 on the outside of the chamber, holds a selected volume of chemical reagent of selected chemical nature and concentration. In the cover, or elsewhere in the wall of the chamber, there is a pressure sensor 28 which can be connected to an electrical recorder. There may be a thermistor or other electrical temperature sensor, which also may go to an electrical recorder. There may be a pressure release valve 30 so as to prevent undue pressure in the chamber and to release the pressure when the test is completed. There may also be a pressure gauge 34 to indicate the gas pressure inside the chamber. Means are also provided to use the thermistor 26 as a temperature measuring sensor in the liquid 30 in the bottom of the chamber or suspended in the gaseous volume of the chamber, as alternate or duplicate measurements.

To start the test at a selected time, the recorder is started (not shown) and the reagent cup is tilted so as to empty its contents into the container, so that the samples 18 are submerged by the liquid level 30. Chemical reaction then proceeds between the reagent liquid 30 and the samples 18. During this reaction there will be an emission of a gaseous byproduct, such as for example, the emission of carbon dioxide as a result of the use of hydrochloric acid to dissolve limestone. As time goes on the gas pressure in the chamber will increase and such pressure will be sensed by the sensor 28 and indicated on the recorder, the chart being driven proportionate to time. Similarly, the temperature measurement is continuously recorded as a function of time. After a selected time interval, the recorder is stopped and the particles are removed. The container is cleaned and a second test is made with a second set of particles and so on.

In the use of this method for the study of the stripping properties of mineral aggregates coated with asphalt, it is important to know, after a rock sample is coated, how much of it will be stripped away by submergence in running water or by rubbing or wear underwater or other selected treatment. A given sample of mineral aggregate is tested as follows: One group of sample particles is tested without any coating with asphalt. This gives a measurement of the original surface area of the tested particles sample. As nearly as possible, a duplicate set of sample particles is coated with asphalt, stripped under selected conditions and then tested. Since the chemical activity with the reagent will be a function of the total area of the clean mineral surface, the ratios of pressures and temperatures, etc., under identical reagent concentrations and time conditions, should provide a comparison measurement of the two areas of clean rock. Of course, the reagent chosen must not react with the asphalt.

While the drawing shows a rather widespread disposition of the rock samples and a large internal volume to the chamber, it would be desirable to make the chamber of as small an internal volume as possible in order to make the pressure resulting from a selected volume of chemical and a selected volume of aggregate sample correspondingly higher inside the chamber. Also, by making the chamber as small as possible and of a good thermally conducting metal, it might be used as a bomb calorimeter to provide a more accurate measure of the heat generated by the reagent solution and the sample. Thus, various configurations of the equipment might be used and are considered to be part of this invention.

The method is primarily intended to quantitatively measure the amount of exposed surface area on bituminous coated mineral aggregate particles after they have been subjected to the stripping effect of water. However, it is not limited to this particular purpose and could be applied to surface area measurements of a variety of materials that have been crushed, fractured, fragmented or otherwise consists of pieces having non-uniform shapes.

While the method is basically a comparison method, comparing the results of a chemical process on a sample of unknown area to a sample of known reference area, it can be calibrated by making the reference samples discs or slabs or other geometrically shaped pieces of the same material as the particles.

Verification tests were performed on limestone aggregate to ascertain the relationship between aggregate surface area and gas pressure generated in the surface reaction test. Limestone aggregate samples were made up in the form of discs, the dimensions of which were measured and each disc surface area calculated. The discs were then divided into different size groups, with each group having a known surface area. Each group of discs was reacted with a dilute hydrochloric acid (HCl) solution, and the resulting gas pressures measured. A linear relationship between change in gas pressure and limestone aggregate disc surface area was obtained.

It is conceivable that the reference sample can be the same identical pieces as the test sample. That is, the particles are first tested without asphalt coating. Then they are coated, stripped and retested. It has been found that the rate of etching is low and there would be only a minute change in surface area in the first test. However, the etching in the first test may affect the bonding properties of the material. Thus, the preferable method is to use two separate samples of the same material, of the same size range, the same number of particles and the same total weight.

In carrying out the tests to determine stripped surface area, the pressure $P1s$ is measured at 15 seconds after the start and $P2s$ after 90 seconds (for limestone), for the stripped sample. The same pressure measurements are made for the uncoated samples $P1u$ and $P2u$, as for the stripped samples.

The retained coating of asphalt is calculated as follows:

$$RC = 100 - \left(\frac{\Delta Ps}{\Delta Pu}\right) 100$$

where
$RC$ = percent retained coating of stripped sample.
$\Delta PS = P2s - P1s$
= change in pressure for stripped sample.
$\Delta PU = P2u - P1u$
= change in pressure for uncoated sample.

As an example, measurements on a specific sample of Cooperton limestone gave $\Delta Ps = 0.20$ psi; $\Delta Pu = 2.10$ psi, $$RC = 100 - \left(\frac{0.20}{2.10}\right) 100$$

= 100 − 9.52
= approx. 90 percent

Of course, if different weights of particles are used in the stripped and uncoated conditions the ratio must be modified by the ratio of weights.

Aggregate test samples weighed 100 grams and were reacted with a 200 ml acid solution. For limestone aggregate, the acid solution was prepared from 16 ml concentrated hydrochloric acid (HCl) and 184 ml distilled water. Pressures were measured at times of 15 to 90 seconds.

For siliceous aggregates the change in gas pressures between 15 seconds and 300 seconds was used, the longer time being required due to the slower and less violent reaction with the hydrofluoric acid (HF) solution. The acid solution used with siliceous aggregate was prepared using 135 ml of concentrated HF and 35 ml of distilled water.

Of course, for aggregates of mixed composition, multiple tests using appropriate chemical reagents are used.

While the invention has been described with a certain degree of particularity, it it manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. The method of comparative surface area measurement of mineral aggregate samples, comprising:
   a. in a closed container reacting a test sample of surface area ($At$) comprising a selected weight of particles of a selected mineral aggregate of a selected size, with a selected volume of a selected chemical reagent of a selected concentration, said reagent chosen so as to produce a gas as a byproduct of the reaction;
   b. measuring the pressure increase ($Pt$) in said container over a selected interval of time;
   c. in a second test in said same closed container reacting a reference sample of surface area ($Ar$) of the same mineral aggregate in the same volume of chemical reagent;
   d. measuring the pressure increase ($Pr$) in said container over the same selected interval of time; whereby the ratio of ($At$) to ($Ar$) is proportional to the ratio ($Pt$) to ($Pr$.)

2. The method as in claim 1 in which said reference sample comprises a sample of measurable dimensions and calculable surface area.

3. The method as in claim 1 in which said test and reference samples comprise samples of the same material composed of particles of the same size and same total weight.

4. The method as in claim 1 including the steps of measuring the temperature of the gas in said chamber as a function of time.

* * * * *